(12) United States Patent
Jurkovic et al.

(10) Patent No.: US 8,928,197 B2
(45) Date of Patent: Jan. 6, 2015

(54) POLE-TO-POLE ASYMMETRY IN INTERIOR PERMANENT MAGNET MACHINES WITH ARC-SHAPED SLOTS

(75) Inventors: Sinisa Jurkovic, Sterling Heights, MI (US); Khwaja M. Rahman, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 364 days.

(21) Appl. No.: 13/448,516

(22) Filed: Apr. 17, 2012

(65) Prior Publication Data

US 2013/0270957 A1    Oct. 17, 2013

(51) Int. Cl.
*H02K 21/12*    (2006.01)

(52) U.S. Cl.
USPC .................... 310/156.38; 310/156.53

(58) Field of Classification Search
CPC ... H02K 1/2766; H02K 1/276; H02K 1/2773; H02K 1/246
USPC ............. 310/156.53, 156.56, 156.38, 156.39, 310/156.44
See application file for complete search history.

(56) References Cited

U.S. PATENT DOCUMENTS

| | | | |
|---|---|---|---|
| 7,474,029 B2 | 1/2009 | Rahman et al. | |
| 7,847,461 B2 | 12/2010 | Rahman et al. | |
| 7,939,982 B2* | 5/2011 | Horst | 310/156.56 |
| 7,969,058 B2 | 6/2011 | Rahman et al. | |
| 8,350,434 B2* | 1/2013 | Hori et al. | 310/156.53 |
| 2003/0102755 A1* | 6/2003 | Naito et al. | 310/156.39 |
| 2009/0140592 A1 | 6/2009 | Rahman et al. | |
| 2009/0140593 A1 | 6/2009 | Kaiser et al. | |
| 2010/0213781 A1 | 8/2010 | Rahman et al. | |
| 2011/0037339 A1 | 2/2011 | Rahman et al. | |
| 2013/0069470 A1* | 3/2013 | Jurkovic et al. | 310/156.53 |

* cited by examiner

*Primary Examiner* — Hanh Nguyen
(74) *Attorney, Agent, or Firm* — Quinn Law Group, PLLC

(57) ABSTRACT

An interior permanent magnet machine includes a rotor formed with a plurality of slots that are substantially arc-shaped and referred to herein as arc segments. A first layer of arc segments are disposed in a first pole. The first layer defines a first configuration relative to a first arc center. A second layer of arc segments are disposed in a second pole. The second layer defines a second configuration relative to a second arc center. The rotor is configured such that the first configuration is different from the second configuration, thereby exhibiting pole-to-pole asymmetry. The first configuration is sufficiently different from the second configuration such that torque ripple may be minimized. In one embodiment, the first layer includes first, second and third arc segments. The rotor may be configured such that the second arc segment is radially offset relative to the first and third arc segments.

16 Claims, 2 Drawing Sheets

POLE-TO-POLE ASYMMETRY IN INTERIOR PERMANENT MAGNET MACHINES WITH ARC-SHAPED SLOTS

TECHNICAL FIELD

The present invention relates generally to an interior permanent magnet machine, and more particularly, to the configuration of the rotor in the machine.

BACKGROUND

An interior permanent magnet machine generally includes a rotor having a plurality of magnets of alternating polarity around the outer periphery of the rotor. The rotor is rotatable within a stator which generally includes a plurality of windings and magnetic poles of alternating polarity. Permanent magnet machines may produce undesirable torque ripple, resulting in unwanted vibration and noise. Traditionally, the configuration of slots in interior permanent magnet machines is the same from one pole to another.

SUMMARY

An interior permanent magnet machine includes a rotor formed with a plurality of slots that are substantially arc-shaped and referred to herein as arc segments. A first layer of arc segments are disposed in a first pole. The first layer defines a first configuration relative to a first arc center. A second layer of arc segments are disposed in a second pole. The second layer defines a second configuration relative to a second arc center. The rotor is configured such that the first configuration is different from the second configuration, thereby exhibiting pole-to-pole asymmetry. The first configuration is sufficiently different from the second configuration such that torque ripple may be minimized. The torque pulsation created by the first pole may be reduced by the counter torque pulsation created by the second pole, thereby minimizing torque ripple.

In one embodiment, the first layer includes first, second and third arc segments defined relative to a first arc center. The first and third arc segments are located at a first distance from the first arc center, while the second arc segment is located at a second distance from the first arc center. The rotor may be configured such that the first, and second distances are each different from one another, i.e., the second arc segment is radially offset from the first arc center relative to the first and third arc segments.

The second layer may include fourth, fifth and sixth arc segments defined relative to a second arc center and disposed in the second pole. The fourth and sixth arc segments are located at a third distance from the second arc center, while the fifth arc segment is located at a fourth distance from the second arc center. The rotor may be configured such that the first, second, third and fourth distances are each different from one another.

The plurality of arc segments may include a third layer disposed in the first pole and a fourth layer disposed in the second pole. The first, second, third and fourth layers each define a first, second, third and fourth thickness, respectively. The rotor may be configured such that the first, second, third and fourth thickness are each different from one another.

Each of the first, second, third and fourth layers may define a respective inner and a respective outer border. The inner and outer borders of the first layer may be located at a first inner distance and a first outer distance from the first arc center, respectively. The inner and outer borders of the second layer may be located at a second inner distance and a second outer distance from the second arc center, respectively. The inner and outer borders of the third layer may be located at a third inner distance and a third outer distance from the first arc center, respectively. The inner and outer borders of the fourth layer may be located at a fourth inner distance and a fourth outer distance from the second arc center, respectively. The rotor may be configured such that the first, second, third and fourth inner and outer distances are each different from one another.

The above features and advantages and other features and advantages of the present invention are readily apparent from the following detailed description of the best modes for carrying out the invention when taken in connection with the accompanying drawings.

DETAILED DESCRIPTION

Figure 1:
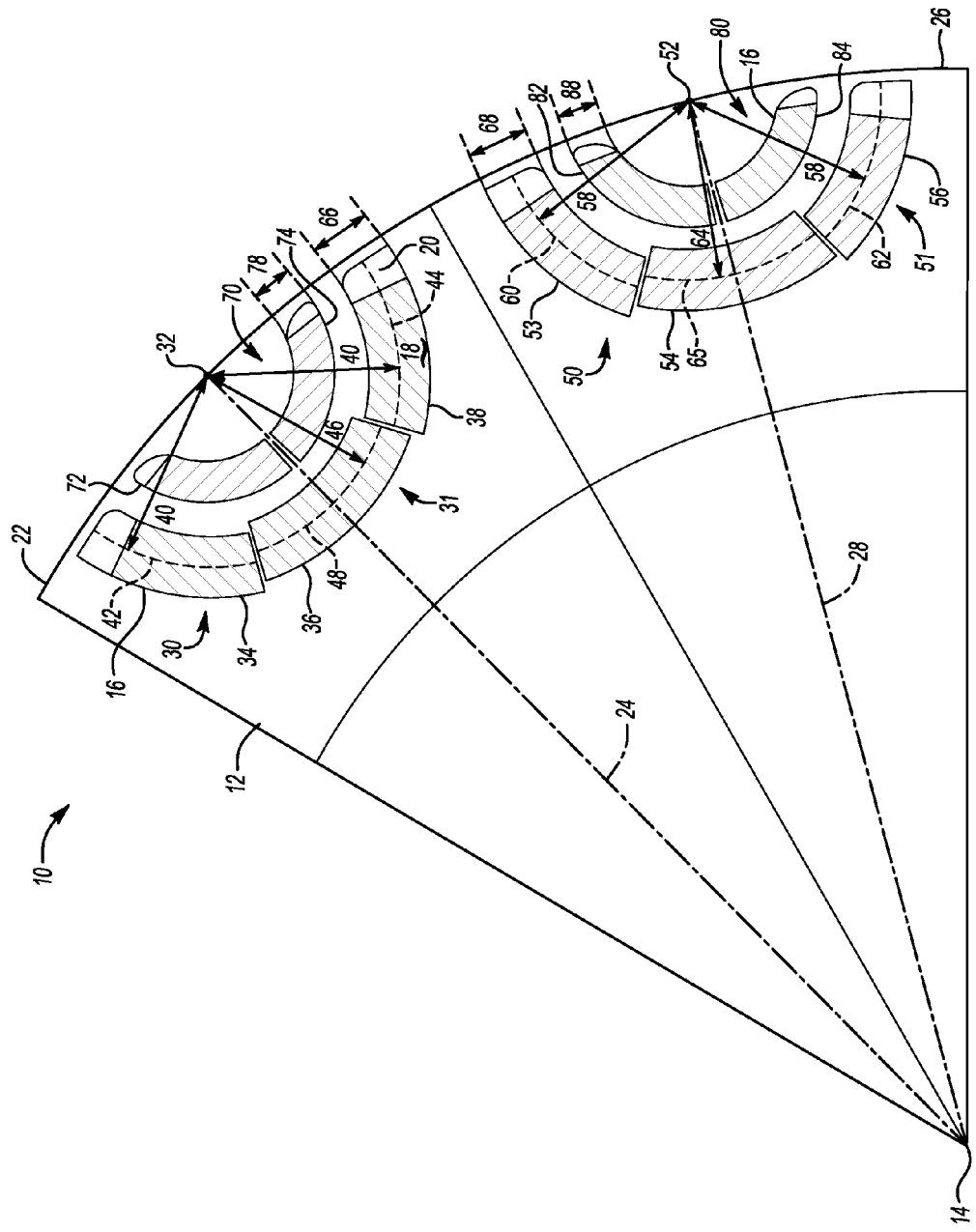
FIG. 1 is a schematic cross-sectional view of an interior permanent magnet machine, in accordance with a first embodiment of the present disclosure.

Referring to the Figures, wherein like reference numbers refer to the same or similar components throughout the several views, FIG. 1 is a schematic cross-sectional view of a double-barrier interior permanent magnet machine 10. The machine 10 includes a rotor 12 having an origin 14. The rotor 12 is rotatable within a generally annular stator (not shown). The rotor 12 includes a plurality of slots 16 that extend three-dimensionally into the rotor 12. All or a portion of the slots 16 may be filled with permanent magnets 18. Air pockets 20 may be incorporated into the structure at various locations. The rotor 12 includes a first pole 22 defined by a first pole axis 24 and a second pole 26 defined by a second pole axis 28. Any number of poles may be present in the rotor 12.

The rotor 12 may be formed with the slots 16 arranged in any number of layers or barriers within each pole. The slots 16 may be substantially arc-shaped and are referred to herein as arc segments. Referring to FIG. 1, the slots 16 include a first layer 30 defined by first, second and third arc segments 34, 36, 38 in the first pole 22. Each of the first, second and third arc segments 34, 36, 38 defines a substantially arc-shaped or annulus-shaped slot relative to a first arc center 32. The first and third arc segments 34, 38 are located at a first distance 40 from their respective centerlines 42, 44 to the first arc center 32. The first and third arc segments 34, 38 are configured to be symmetric relative to the first pole axis 24. The second arc segment 36 is adjacent to the first and third arc segments 34, 38 and located at a second distance 46 from its centerline 48 to the first arc center 32. The first distance 40 is different from the second distance 46. The rotor 12 is configured such that the first and second distances 40, 46 are different from each other.

Referring to FIG. 1, a second layer 50 is defined by fourth, fifth and sixth arc segments 53, 54, 56 located in the second pole 26. Each of the fourth, fifth and sixth arc segments 53, 54, 56 defines a substantially arc-shaped or annulus-shaped slot relative to a second arc center 52. The fourth and sixth arc segments 53, 56 are located at a third distance 58 from the second arc center 52 to their respective centerlines 60, 62. The fourth and sixth arc segments 53, 56 are configured to be symmetric relative to the second pole axis 28. The fifth arc segment 54 is adjacent to the fourth and sixth arc segments 53, 56 and located at a fourth distance 64 from the second arc center 52 to its centerline 65. The first, second, third and fourth distances 40, 46, 58, 64 are configured to be sufficiently different from one another such that torque ripple is minimized. In one example, the first, second, third and fourth distances 40, 46, 58, 64 are approximately 14, 20, 12, 19 mm, respectively.

In summary, referring to FIG. 1, a first layer 30 of first, second and third arc segments 34, 36, 38 defines a first configuration 31 in which the middle segment (or second arc segment 36) is radially offset relative to the first and third arc segments 34, 38, that is, positioned at a second distance 46 from the first arc center 32 instead of a first distance 40 as are the first and third arc segments 34, 38. Referring to FIG. 1, the second layer 50 having fourth, fifth and sixth arc segments 53, 54, 56 defines a second configuration 51 in which the middle arc segment (or fifth arc segment 54) is radially offset relative to the fourth and sixth arc segments 53, 56, that is, positioned at a fourth distance 64 from the second arc center 52 instead of a third distance 58 as are the fourth and sixth arc segments 53, 56.

Thus the rotor 12 is configured such that the first configuration 31 is different from the second configuration 51, thereby exhibiting pole-to-pole asymmetry. The first configuration 31 is sufficiently different from the second configuration 51 such that torque ripple may be minimized. The torque pulsation created by the first pole 22 may be reduced by the counter torque pulsation created by the second pole 26, thereby minimizing torque ripple. The configuration may be different for every pole of the rotor 12 or it may be repeated at every "n" number of poles, where n is 2 to P, P being the total number of poles. For example, a rotor 12 with eight poles may have eight different configurations or it may have four different configurations for adjacent poles that is repeated for the remaining four poles.

Referring to FIG. 1, the first and second layers 30, 50 may incorporate or have first and second thicknesses 66, 68, respectively. The first and second thicknesses 66, 68 may be the same or different from one another. The first and second layers 30, 50 described above may include any number of arc segments within. The rotor 12 may include three, four or more layers in each of its poles, with each layer incorporating any number of arc segments.

A third layer 70 (of arc segments) may be formed in the first pole 22 and may include a plurality of arc segments 72, 74 that are symmetric relative to the first pole axis 24. A fourth layer 80 may be formed in the second pole 26 and may include a plurality of arc segments 82, 84 that are symmetric relative to the second pole axis 28. The third and fourth layers 70, 80 may incorporate or have third and fourth thicknesses 78, 88, respectively. In one example, the first, second, third and fourth thicknesses 66, 68, 78, 88 are each different from one another. In another example, the first, second, third and fourth thicknesses 66, 68, 78, 88 are all the same.

Figure 2:
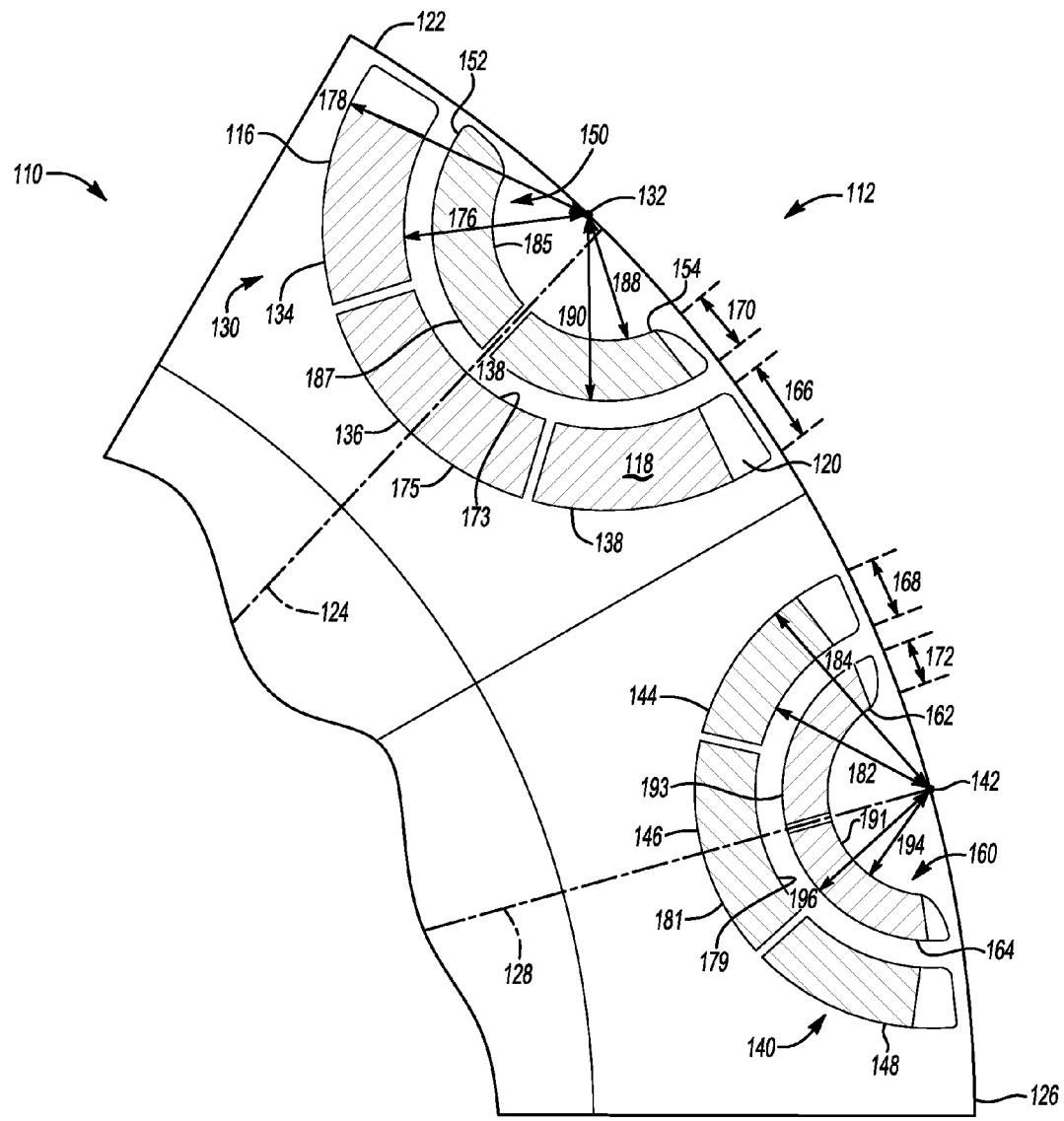
FIG. 2 is a schematic fragmentary cross-sectional view of an interior permanent magnet machine, in accordance with a second embodiment.

Referring to FIG. 2, a second embodiment illustrated by an interior permanent magnet machine 110 is shown. The machine 110 includes a rotor 112. As shown in FIG. 1, the plurality of slots 116 may be substantially arc-shaped (cross-section wise). The rotor 112 may be formed with any number of slots 116, all or a portion of which may be filled with permanent magnets 118. Air pockets 120 may be incorporated into the structure at various locations. The rotor 112 includes a first pole 122 defined by a first pole axis 124 and a second pole 126 defined by a second pole axis 128. The rotor 112 may include any number of poles, each of which is defined by a respective pole axis.

The rotor 112 may include two or more barriers or layers of slots 116 in each pole. The slots 116 may be substantially arc-shaped and are referred to herein as arc segments. Referring to FIG. 2, a first layer 130 includes first, second and third arc segments 134, 136, 138 in the first pole 122. Each of the first, second and third arc segments 134, 136, 138 define an annulus-shaped or substantially arc-shaped segment relative to a first arc center 132. A second layer 140 includes fourth, fifth and sixth arc segments 144, 146, 148 in the second pole 126. Each of the fourth, fifth and sixth arc segments 144, 146, 148 defines an annulus-shaped or substantially arc-shaped segment relative to a second arc center 142.

Referring to FIG. 2, a third layer 150 includes one or more arc segments 152, 154 each of which defines a substantially arc-shaped segment relative to the first arc center 132 in the first pole 122. A fourth layer 160 includes one or more arc segments 162, 164 each of which defines a substantially arc-shaped segment relative to the first arc center 142 in the second pole 126.

Referring to FIG. 2, the first, second third and fourth layers 130, 140, 150, 160 each incorporate first, second, third and fourth thicknesses 166, 168, 170, 172, respectively, which is the width of the respective layer. The rotor 112 is configured such that the first, second, third and fourth thicknesses 166, 168, 170, 172 are each different from one another. The torque pulsation created by the first pole 122 may be reduced by the counter torque pulsation created by the second pole 126, thereby minimizing torque ripple. The configuration may be different for every pole or it may be repeated at every "n" number of poles, where n is 2 to P, P being the total number of poles.

As shown in FIG. 2 and described below, each of the first, second, third and fourth layers 130, 140, 150, 160 defines a respective inner and a respective outer border. Referring to FIG. 2, the first layer 130 includes inner and outer borders 173, 175 located at first inner and first outer distances 176, 178 from the first arc center 132, respectively. As shown in FIG. 2, each point on the inner and outer borders 173, 175 is equidistant from the first arc center 32. The second layer 140 includes inner and outer borders 179, 181 located at second inner and second outer distances 182, 184 from the second arc center 142, respectively. The third layer 150 includes inner and outer borders 185, 187 located at third inner and third outer distances 188, 190 from the first arc center 132, respectively. The fourth layer 160 includes inner and outer borders 191, 193 located at fourth inner and fourth outer distances 194, 196 from the second arc center 142, respectively.

The rotor 112 may be configured such that each of the following eight distances are different from one another: the first, second, third and fourth inner and outer distances 176, 178, 182, 184, 188, 190, 194, 196. The eight distances are sufficiently different such that torque ripple is minimized. The configuration (as defined by the eight distances 176, 178, 182, 184, 188, 190, 194, 196) may be different for every pole or it may be repeated at every "n" number of poles, where n is 2 to P, P being the total number of poles.

The specific values of the first, second, third and fourth distances 40, 46, 58, 64 in the first embodiment (FIG. 1) and the first, second, third and fourth inner and outer distances 176, 178, 182, 184, 188, 190, 194, 196 in the second embodiment (FIG. 2) may be optimized to obtain the desired level of averaging or torque ripple minimization. This optimization may be performed empirically or through conventional computer modeling methods known in the art. By way of example only, Design of Experiments (DOE) is a methodology for setting up a set of virtual or physical experiments in which input variables are varied in a systematic manner, for the purpose of determining the correlation between input variables and to predict results or output, as opposed to the one-factor-at-a-time method. For example, one parameter may be varied and the output or torque ripple produced observed for resultant changes. In one example, the optimization may be set up with the objective that the torque ripple be between 2 and 5 Newton-meters ("Nm"). The torque ripple may be defined as the difference between the minimum and maximum torque generated during one cycle or revolution. Optionally, the optimization may be set up with the constraint that the minimum average torque generated by the machine is at least 100 Nm. Another constraint may be that the total energy loss in the system is less than or equal to 100 kilo Joules. Another constraint may be that the electromotive force or induced voltage is greater than or equal to 30 Volts.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An interior permanent magnet machine comprising:
a rotor having a plurality of arc segments that are substantially arc-shaped;
wherein the rotor includes a first and a second pole;
wherein the plurality of arc segments includes a first layer disposed in the first pole, the first layer defining a first configuration relative to a first arc center;
wherein the plurality of arc segments includes a second layer disposed in the second pole, the second layer defining a second configuration relative to a second arc center;
wherein the rotor is configured such that the first configuration is sufficiently different from the second configuration to minimize torque ripple;
the first layer includes first, second and third arc segments in the first pole, the second arc segment being adjacent to the first and third arc segments;
the first and third arc segments are located at a first distance from the first arc center, the first and third arc segments being symmetric relative to a first pole axis;
the second arc segment is located at a second distance from the first arc center; and
the first distance is different from the second distance.

2. The machine of claim 1, wherein:
the second layer includes fourth, fifth and sixth arc segments in the second pole, the fifth arc segment being adjacent to the fourth and sixth arc segments;
the fourth and sixth arc segments are located at a third distance from the second arc center;
the fifth arc segment is located at a fourth distance from the second arc center; and
the first, second, third and fourth distances are each different from one another.

3. The machine of claim 2, wherein the first, second, third and fourth distances are approximately 14, 20, 12, 19 mm, respectively.

4. The machine of claim 2, wherein the plurality of arc segments includes a third layer disposed in the first pole, the third layer being symmetric relative to the first pole axis.

5. The machine of claim 2, wherein the plurality of arc segments includes a fourth layer disposed in the second pole, the fourth layer being symmetric relative to the second pole axis.

6. The machine of claim 1, wherein the first layer in the first pole defines a first thickness;
the second layer in the second pole defines a second thickness;
the plurality of arc segments includes a third layer disposed in the first pole and a fourth layer disposed in the second pole;
the third and fourth layers define a third and a fourth thickness, respectively; and
the first, second, third and fourth thicknesses are each different from one another.

7. An interior permanent magnet machine comprising:
a rotor having a plurality of arc segments that are substantially arc-shaped;
wherein the rotor includes a first and a second pole;
wherein the plurality of arc segments includes a first layer disposed in the first pole, the first layer defining a first configuration relative to a first arc center;
wherein the plurality of arc segments includes a second layer disposed in the second pole, the second layer defining a second configuration relative to a second arc center;
wherein the rotor is configured such that the first configuration is sufficiently different from the second configuration to minimize torque ripple;
wherein the first layer in the first pole defines a first thickness;
wherein the second layer in the second pole defines a second thickness;
wherein the plurality of arc segments includes a third layer disposed in the first pole and a fourth layer disposed in the second pole;
wherein the third and fourth layers define a third and a fourth thickness, respectively; and
wherein the first, second, third and fourth thicknesses are each different from one another.

8. The machine of claim 7, wherein the first, second, third and fourth thicknesses are approximately 6, 4, 3, 2 mm, respectively.

9. The machine of claim 7, wherein the first, second, third and fourth thicknesses are approximately 10, 8, 6, 4 mm, respectively.

10. The machine of claim 7, wherein the plurality of arc segments includes a third layer disposed in the first pole and a fourth layer disposed in the second pole;
each of the first, second, third and fourth layers defines a respective inner and a respective outer border;
the respective inner and outer borders of the first layer are located at a first inner distance and a first outer distance from the first arc center, respectively;
the respective inner and outer borders of the second layer are located at a second inner distance and a second outer distance from the second arc center, respectively;
the respective inner and outer borders of the third layer are located at a third inner distance and a third outer distance from the first arc center, respectively;
the respective inner and outer borders of the fourth layer are located at a fourth inner distance and a fourth outer distance from the second arc center, respectively; and
the first, second, third and fourth inner and outer distances are each different from one another.

11. The machine of claim 10, wherein the first, second, third and fourth inner and outer distances are approximately 14, 20, 12, 19 mm, respectively.

12. An interior permanent magnet machine comprising:
a rotor having a plurality of arc segments that are substantially arc-shaped;

wherein the rotor includes a first and a second pole;

wherein the plurality of arc segments includes a first layer disposed in the first pole, the first layer defining a first configuration relative to a first arc center;

wherein the plurality of arc segments includes a second layer disposed in the second pole, the second layer defining a second configuration relative to a second arc center;

wherein the rotor is configured such that the first configuration is sufficiently different from the second configuration to minimize torque ripple;

wherein the plurality of arc segments includes a third layer disposed in the first pole and a fourth layer disposed in the second pole;

wherein each of the first, second, third and fourth layers defines a respective inner and a respective outer border;

wherein the respective inner and outer borders of the first layer are located at a first inner distance and a first outer distance from the first arc center, respectively;

wherein the respective inner and outer borders of the second layer are located at a second inner distance and a second outer distance from the second arc center, respectively;

wherein the respective inner and outer borders of the third layer are located at a third inner distance and a third outer distance from the first arc center, respectively;

wherein the respective inner and outer borders of the fourth layer are located at a fourth inner distance and a fourth outer distance from the second arc center, respectively; and wherein the first, second, third and fourth inner and outer distances are each different from one another.

13. The machine of claim 12, wherein the first, second, third and fourth inner and outer distances are approximately 14, 20, 12, 19 mm, respectively.

14. The machine of claim 12, wherein the first layer in the first pole defines a first thickness;

the second layer in the second pole defines a second thickness;

the plurality of arc segments includes a third layer disposed in the first pole and a fourth layer disposed in the second pole;

the third and fourth layers define a third and a fourth thickness, respectively; and the first, second, third and fourth thicknesses are each different from one another.

15. The machine of claim 14, wherein the first, second, third and fourth thicknesses are approximately 6, 4, 3, 2 mm, respectively.

16. The machine of claim 14, wherein the first, second, third and fourth thicknesses are approximately 10, 8, 6, 4 mm, respectively.

* * * * *